Patented July 10, 1923.

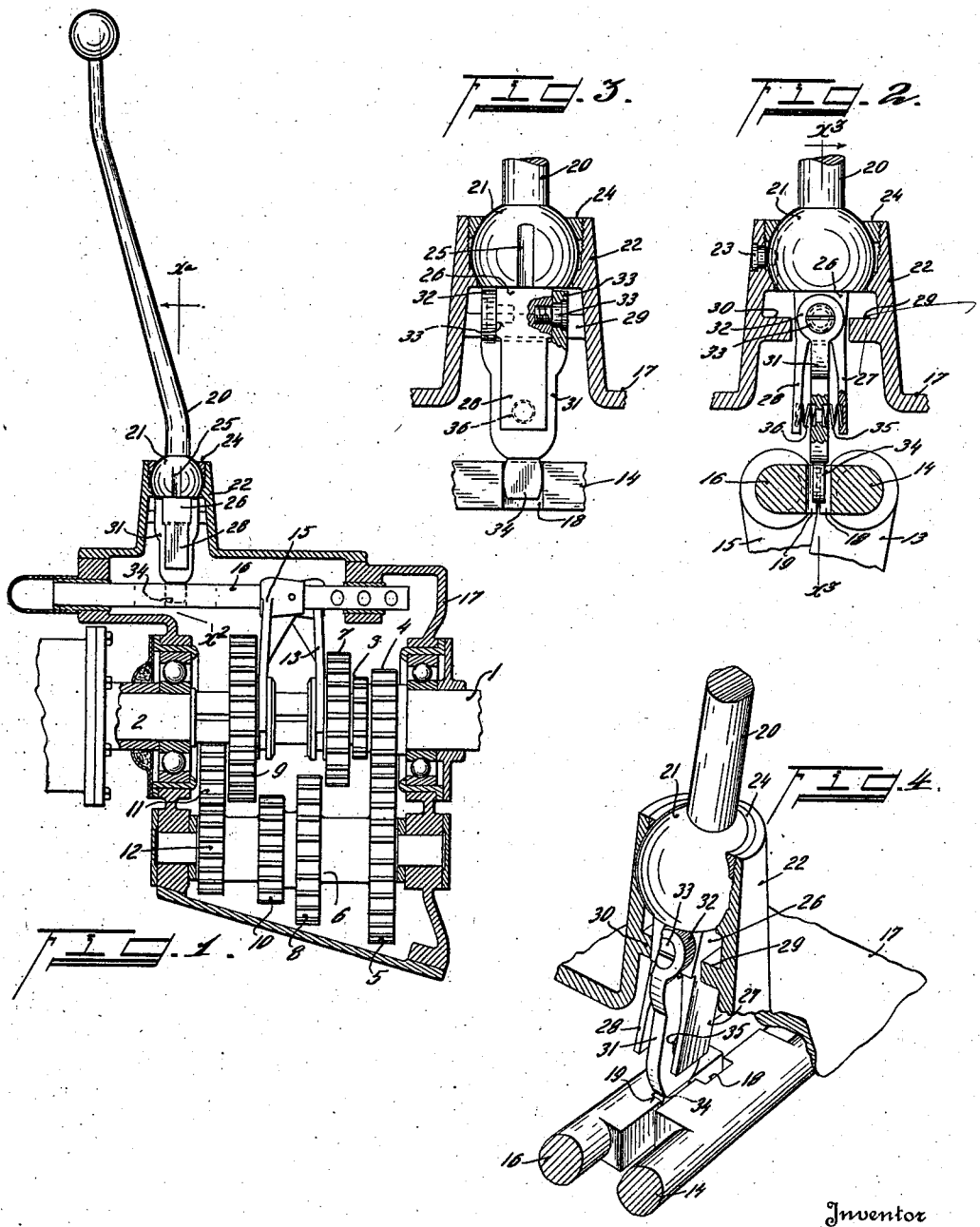

1,461,457

UNITED STATES PATENT OFFICE.

PERCY F. RICE, OF TUSTIN, CALIFORNIA.

GEAR-SHIFT LEVER.

Application filed June 6, 1921. Serial No. 475,248.

*To all whom it may concern:*

Be it known that I, PERCY F. RICE, a citizen of the United States, and a resident of Tustin, in the county of Orange and State of California, have invented certain new and useful Improvements in Gear-Shift Levers, of which the following is a specification.

This invention relates to gear-shifts levers for speed change gearing and is particularly directed to a gear-shift lever adapted for co-operation with the standard type of sliding gear transmission usually employed for motor vehicles.

The major object of the invention is to provide a manually-operated gear-shift lever carrying an operating member which is controlled for translation in the conventional H-shaped path of movement during the various gear-shifting operations, the lever being at all times free for transverse preparatory movement prior to the actual shifting of the gearing so that such actual shifting of the gearing is accomplished entirely by straight longitudinal movements of the lever.

Another object of the invention is to provide a gear-shift lever having means which alternately operates a pair of adjacent shift rods by movement in the conventional H-path, with provision whereby the lever may be independently transversely shifted while either in its forward or rearward position, prior to a gear-shifting movement.

Another object is to provide a gear-shift lever having a transversely flexible operating end co-operating with the shift rods and which will permit a transverse movement of the handle portion of the lever at any time to tension said flexible end for a subsequent automatic transverse movement thereof during the gear-shifting movement of the lever.

A further object is to provide a gear-shift lever having a transversely flexible operating member co-operating with the shift rods of speed change transmission gearing, which will permit a preparatory transverse movement of the handle portion of the lever at any time to exercise a controlling influence on the flexible operating member effective during a subsequent gear-shifting movement to automatically urge said member to follow the conventional H-path of movement during a gear-shift movement of the lever.

Another object is to provide a gear-shift lever having an operating handle and a gear-shift member carried thereby, and arranged to permit the operating handle to be moved in a rectangular path and the gear-shift member to move in the conventional H-shaped path, the lateral shift of said member through the neutral path being automatically effected by tension means tensioned by a prior preparatory transverse movement of the operating handle.

Various other objects and advantages will be more fully apparent from the following description of the accompanying drawings, which form a part of this disclosure and which illustrate a preferred form of embodiment of the invention.

Of the drawings,

Figure 1 is a vertical longitudinal section through a motor vehicle transmission gear-set of the standard sliding gear type, with the gear-shift lever of the present invention incorporated therewith;

Figure 2 is an enlarged section on line $x^2$—$x^2$ of Figure 1;

Figure 3 is a section on line $x^3$—$x^3$ of Figure 2; and

Figure 4 is a fragmentary perspective view of the gear-shift lever and shift rods, looking from the forward end of the gear-set.

The speed change gear-set illustrated in the drawings is of the standard sliding gear type having three forward speeds and reverse and includes the drive shaft 1 and alined driven shaft 2 with the intermediate clutch indicated at 3 and serving to connect the shafts to establish a direct high speed drive. The drive shaft has a gear 4 in constant mesh with a gear 5 of the counter shaft gear unit 6 and keyed on the driven shaft 2 is a sliding gear 7 adapted to mesh with a gear 8 of the gear unit 6 to establish an intermediate speed connection. A sliding gear 9 keyed on the driven shaft meshes with a gear 10 of the gear unit 6 for low speed connection or with an idler gear 11 meshing with a gear 12 of the gear unit, for reverse drive connection. The sliding gear 7 is translated by a yoke arm 13 fixed on a shift rod 14 and the sliding gear 9 is translated by a similar yoke arm 15 fixed on a shift rod 16.

The rods 14 and 16 are horizontally alined parallel to each other and are mounted to slide longitudinally in bearings in the housing 17 of the gear-set and are provided with opposed notches 18 and 19, respectively, (see Figure 4).

As thus far described, the mechanism is of standard construction, and in the usual form of such devices the ordinary one piece type of gear-shift lever engages the notches 18 and 19 alternately and functions to alternately shift the rods 14, 16 longitudinally to shift the gears for the various changes, the lever having the conventional H-shaped movement excepting when shifting directly between low and reverse and between intermediate and high.

It is evident that with the usual structure the shifting through the neutral position is not accomplished with a speed which is desirable and consequently it frequently happens that the gears clash and the shift cannot be made without stopping the vehicle.

In the present invention the shift through neutral is accomplished by automatically functioning means which shifts transversely through neutral position independently of a companion transverse shift of the manually-operated shift-lever.

As illustrated, the gear-shift lever is of the ball-and-socket type and comprises a lever 20 having a ball end 21 which is positioned in the upper end of a socket extension 22 of the housing 17, the ball end 21 resting upon a seat 23 and retained thereon by a retaining ring 24 screw-threaded into the bore of the extension 22. A key-bolt 23 carried by said extension engages a slot 25.

Depending from the lower surface of the bell end 21 and rigid therewith is an arm 26 having a bifurcated lower end providing opposed limbs 27, 28, and formed on the walls of the extension 22 are opposed abutment ribs 29, 30 with which the arm 26 alternately engages to limit the transverse swing of the shift lever 20.

An operating member 31 has a bifurcated upper end forming opposed ears 32 which are horizontally pivoted on the arm 26 by bolts 33, the member 31 depending between the limbs 27, 28 of the arm 26 and terminating with a nose 34 positioned to engage in the notches 18, 19 of the shift rods. Springs 35, 36 are interposed between the member 31 and the respective limbs 27, 28 of the arm 26 and normally maintain said member centrally disposed between said limbs when the shift rods 14, 16 are in neutral position (see Figure 2).

In operation, the lever 20 being in neutral position, the device may be manipulated in the usual manner if desired, as, for instance, the lever 20 may be shifted to the left while in neutral to engage the nose 34 into the notch 19 of the low and reverse shift rod 19, and then drawn rearwardly to shift into low (or forwardly to shift into reverse). Then the lever 20 may be moved forward to neutral, shifted to the right through neutral to engage the nose 34 into the notch 18 of the intermediate and high shift rod 14, and then moved forward to shift into intermediate. The lever 20 may next be drawn rearward to shift into high.

Utilizing the advantages of the present structure in its preferred method of manipulation, the lever 20 is moved to low in the usual manner, this position being illustrated in Figure 4, then as a preparatory step and without operation of the clutch pedal of the vehicle or without disconnecting the power from the gear-set, the lever 20 is shifted transversely to the right while in its rear position. This transverse shift of the lever 20 causes the limbs 27, 28 to swing transversely relative to the member 31, the limb 28 compressing the spring 36 to build up its stored energy for subsequent automatic operation to independently swing the member 31. At this time the lever 20 will be in the high speed position while the member 31 is in low speed position engaging the rod 16 with the tension of the spring 36 urging said member 31 towards the rod 14. The lever 20 is next moved directly forward to intermediate position and during this forward movement the member 31 upon reaching neutral position will automatically be forced from the notch 19 of the rod 16 and into the notch 18 of the rod 14 by the energy of the spring 36, and will then translate the rod 14 to shift the gears into intermediate. A shift from intermediate to high is then made by drawing the lever 20 directly rearwardly in the ordinary manner.

If it is desired to shift directly from high to low, the lever 20 is first shifted transversely to the left and then forwardly past neutral to allow the member 31 to automatically shift through neutral and then directly rearwardly into low. A shift from low to high, from reverse to intermediate or from intermediate to reverse is made in a similar manner.

To afford a clear understanding of the several operations a description thereof as it relates only to the movements of the manually operated lever 20 will be given, considered from the viewpoint of the driver in the seat of the car.

Considering the car at rest and the shift lever in "neutral", the lever may be shifted to any desired position in the usual manner. Considering that the lever has been shifted to "low" and the car moving, and it is next desired to shift to "intermediate", with the clutch still engaged, the lever is shifted transversely directly to "high" position and held there, the car still running in "low". This is a preparatory step and at any subsequent time the shift to "intermediate" may be made by unclutching the power and moving the lever directly forward to "intermediate". The shift from "intermediate" to "high" is made in the usual manner. To shift from "intermediate" to "low" the lever is shifted to "reverse", the car still running in "intermediate", and subsequently the power is unclutched and the lever drawn directly rearward to "low" position. To shift from "high" to "low" without going through intermediate the lever is shifted transversely from "high" position to "low" position prior to unclutching the power and subsequently the power is unclutched and the lever pushed forward slightly past "neutral" and then directly back again to "low". The shifts from "low" directly to "high", from "intermediate" directly to "reverse", and from "reverse" directly to "intermediate" are each accomplished by a similar sequence of first shifting the lever transversely to the opposite side and subsequently moving the lever past "neutral" and directly back again.

It will be evident from the above that the device of the present invention provides a gear-shift lever capable of being transversely shifted at any time as a preparatory step to the subsequent actual shifting of the speed change gears and having a flexible gear operating end which is automatically operated by spring energy stored by the preparatory shifting of the lever.

The specific mechanism herein shown and described is admirably adapted to fulfill the objects primarily set forth, but it is to be understood that it is susceptible of such modifications and changes as come within the scope of the claims which follow.

I claim:

1. In a device of the nature disclosed, the combination with a speed change gearing having a plurality of shift rods carrying gear shifting means, of a universally movable gear-shift lever having a flexible rod operating end, and tension means carried by the lever and functioning to yieldingly maintain the operating end in a normal position relative to the lever.

2. In a device of the nature disclosed, the combination with a speed change gearing having a pair of shift rods carrying gear-shifting means, of a universally movable gear-shift lever having a bifurcated end, an operating member pivoted on the lever for transverse movement relative to the rods and adapted to alternately engage and translate the rods and positioned between the opposed furcations of the lever, and tension means between each furcation and said member.

3. In a device of the nature disclosed, the combination with a speed change gearing having a pair of shift rods carrying gear shifting means and having opposed notches, of a universally movable gear-shift member, an operating member pivoted to swing on the lever transversely of the rods and adapted to alternately engage in the notches of the rods, and tension means carried by the lever and engaging said member, said means being tensioned by a movement of the lever for subsequent functioning to automatically shift said member.

4. In a device of the nature disclosed, the combination with a speed change gearing including means for shifting the gears in a speed changing operation, of a gear-shift lever universally movable and having an operating end movable transversely of the rods and yieldingly maintained in normal position by spring tension, said yielding operating end permitting a selective movement of the lever while the gearing is in driving engagement preparatory to a speed changing operation.

5. In a device of the nature disclosed, the combination with a speed change gearing having a pair of shift rods carrying gear shifting means, of a universally movable gear-shift lever having an operating end flexible transversely of the rods for alternately engaging said rods and arranged to permit a transverse selective movement of the lever while the gearing is in driving engagement preparatory to a subsequent shifting of the gearing.

6. A gear-shift lever as an article of manufacture, comprising a handle having a ball end, a member pivoted thereto to swing in a single plane, and tension means yieldingly maintaining said member in normal position.

7. A gear shifting lever including means for mounting the same whereby it may be both swung and tilted, and the lower end of which is rigid in the direction of swinging the lever but is flexible in the direction of tilting the lever.

Signed at Tustin, California, this 27th day of May, 1921.

PERCY F. RICE.

Witnesses:
THOS. I. WILSON,
ANITA M. PREBLE.